July 20, 1954
S. KASS
2,684,474
METEOROLOGICAL TELEMETERING SYSTEM
Filed April 20, 1951
2 Sheets-Sheet 1
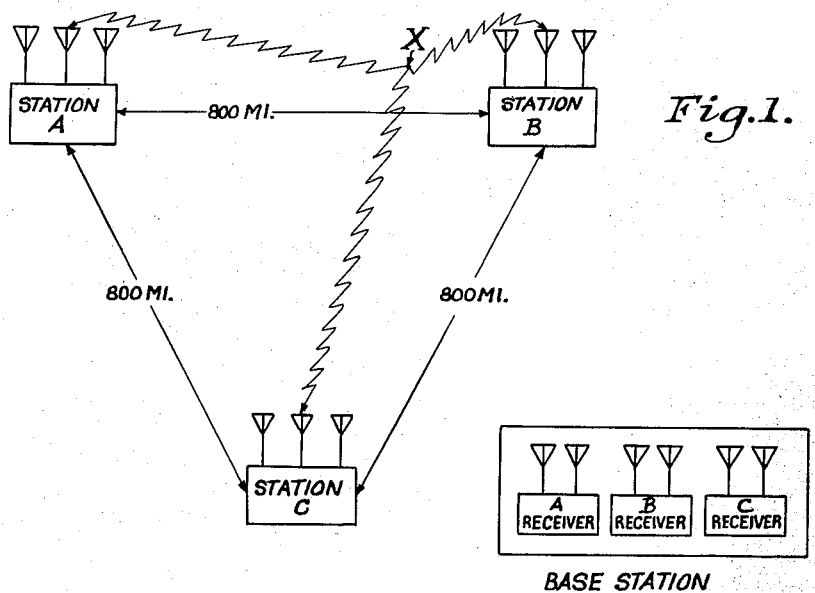
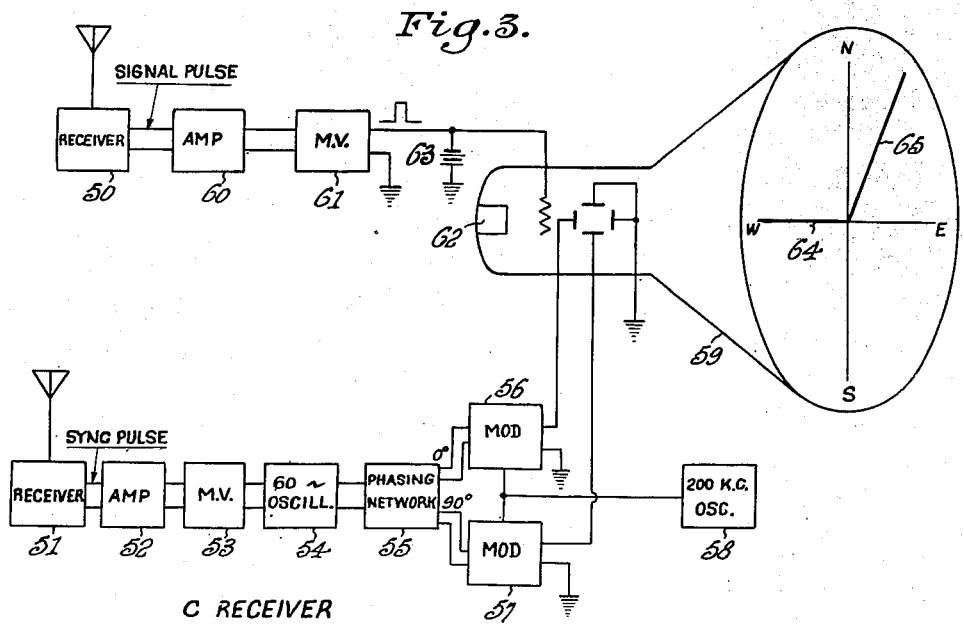
INVENTOR.
SHOLOM KASS
BY
Harry M. Saragovitz
ATTORNEY

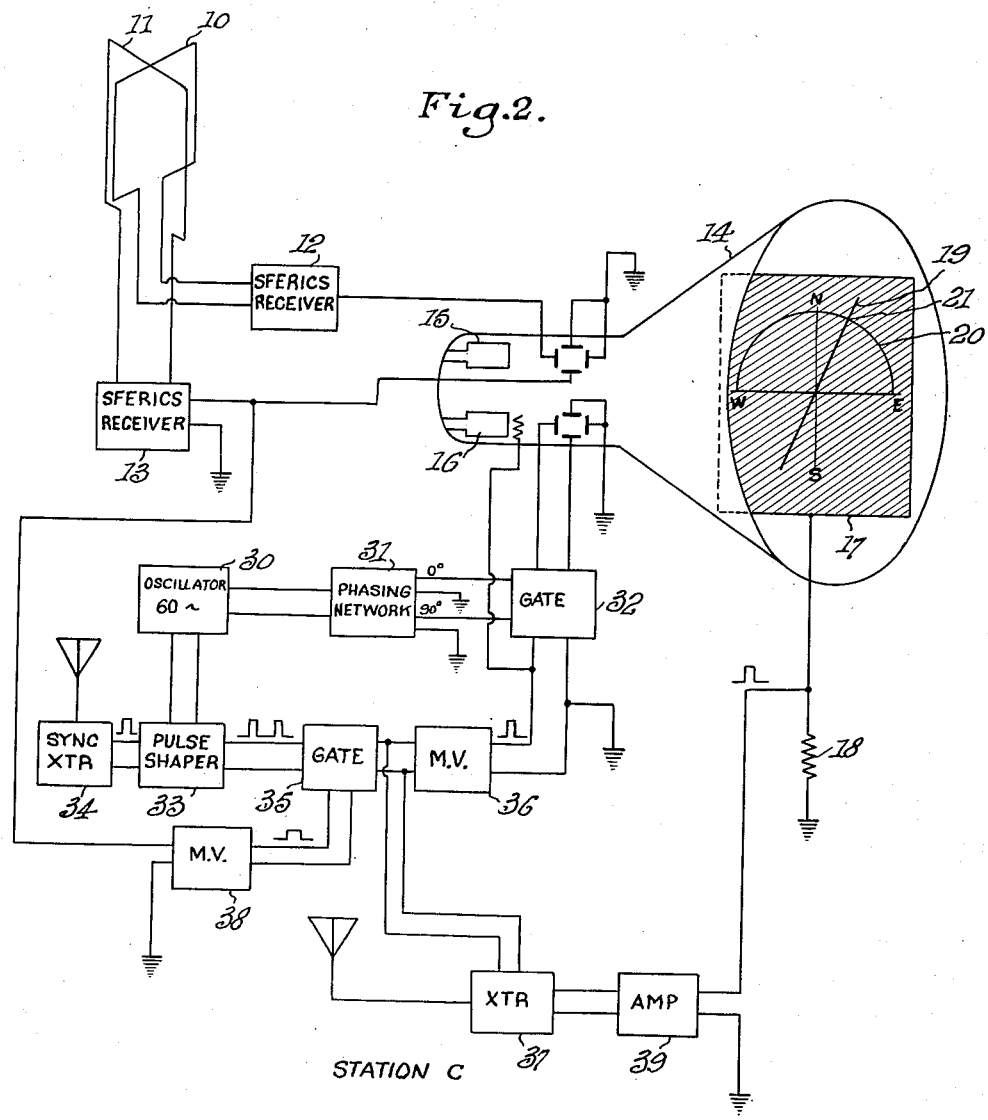

Patented July 20, 1954

2,684,474

UNITED STATES PATENT OFFICE 2,684,474

METEOROLOGICAL TELEMETERING SYSTEM

Sholom Kass, Rehovot, Israel, assignor to the United States of America as represented by the Secretary of the Army Application April 20, 1951, Serial No. 222,123

4 Claims. (Cl. 340—212)

(Granted under Title 35, U. S. Code (1952), sec. 266)

The invention described herein may be manufactured and used by or for the Government for governmental purposes, without the payment to me of any royalty thereon.

The present invention relates generally to a meteorological telemetering system and more specifically to the location of atmospheric disturbances by the use of several widely spaced direction finding stations.

It is well known that certain meteorological situations, such as convective storms, are attended by severe electrical disturbances. The importance of this phenomenon becomes evident when it is remembered that standard hourly meteorological observations include the presence or absence of thunderstorms. It is also known that electrical discharges can occur in the upper atmosphere remote from the ground and that the existence and source of these discharges may be ascertained at points remote therefrom by means of the electromagnetic energy radiated from such a discharge.

This radiant energy arises from a sudden electrical impulse which represents an abrupt flow of current due to an electrical discharge of the type often seen during lightning storms. Knowledge of the geographical locations of areas of intense electrical activity is of considerable value to the meteorologist, especially if the areas involved are those where few observations can be made by regular observers, areas such as oceans and sparsely populated land areas.

It is the common practice in locating sources of electrical disturbances to employ techniques similar to that applied in radio direction finding. One system often used for this purpose includes a suitable antenna coupled through a receiver to a cathode ray tube oscilloscope. The oscilloscope displays an immediate indication of the azimuth of the electrical disturbance, said indication assuming the form on the tube screen of a straight line trace whose orientation corresponds to the bearing of the disturbance with respect to the observation post.

If two such direction finder observations are made, the area of the discharge may be fixed by triangulation methods. To attain greater accuracy, usually at least three simultaneous observations are made at posts widely separated by distances of several hundred miles. Direction finding apparatus of this type is adapted to detect atmospheric discharges which occur within ranges extending to several thousand miles from the observation post. Consequently, the equipment which will indicate the direction of each of the individual discharges is continually exhibiting many diverse discharge bearings in rapid succession.

When several widely spaced stations take bearings on a particular discharge, it is clear that some type of coordinating means must be utilized to insure that all stations are taking bearings on the same discharge. The bearing on each discharge from each observation station must also be communicated to the base station by some method in order that the location of the discharge may be plotted.

Heretofore, several methods have been used. One method called for a telephone or radio link between all stations whereby the operator at the base station could signal the observation stations when a bearing was to be taken. The operators at the observation stations would take bearings at this instant and then individually transmit these bearings to the base station by the radio or telephone link.

A second improved method for coordinating the information received at the observation stations is disclosed in U. S. Patent 2,402,688 to Skurnick. Synchronized mechanical scanning devices at each station are utilized to scan the cathode ray tube display and generate pulses indicative of the bearing of an electrical disturbance. These pulses are transmitted to the base station to provide the bearing of a particular discharge from each of the individual stations.

The present invention has many advantages over these methods. The number of discharges that can be received and the bearings thereof transmitted is greatly increased and the problems and inaccuracies due to mechanical scanning and synchronizing is eliminated.

It is a primary object of this invention to overcome the foregoing disadvantages and provide a meteorological telemetering system for automatically transmitting data indicating the bearing of a static discharge from a plurality of observation stations of a base coordinating station.

It is a further object of this invention to transmit the bearing of an electrical discharge from an observation station to a base station by means of modulated pulses.

It is a still further object of this invention to utilize a cathode ray storage tube at an observation station to generate pulses for transmission to a distant station to indicate the bearing of an electrical flash from the observation station.

It is yet another object of this invention to synchronize the scanning beam of a cathode ray storage tube at an observation station with a rotating radial trace of a cathode ray tube at a distant station.

These and further objects of this invention will be more fully understood when the following description is read in connection with the drawing wherein:

Figure 1 is a diagrammatic view illustrating the geographical relation of the observation stations and the base stations, Figure 2 is a schematic diagram in block form of one of the observation stations, and Figure 3 is a schematic diagram in block form of a receiving unit of the base station.

Referring now to Fig. 1, three identical observation stations A, B and C are spaced in a triangular pattern with a distance of 800 miles between stations. This distance is illustrative only and can be varied according to the territory to be covered. A base station is situated in any convenient location and may be positioned at an observation station to reduce the number of bearings that must be transmitted to the base station from the observation stations.

An electrical discharge in the territory being covered is picked up by sferics direction finders at each observation station. Sferics is a term of art derived from atmospherics and used synonymously with lightning discharge, electrical disturbance and the like. Therefore, a sferics receiver is one that will detect the electromagnetic energy radiated from an atmospheric discharge. These bearings are transmitted to the base station by modulated pulses to enable the base station operator to locate the electrical disturbance by conventional triangulation methods, the base station comprising as many receiver units as there are observation stations.

For a further description of observation station C, reference is made to Fig. 2 in which the circuits are shown in block form. Loop antennas 10 and 11 are arranged in 90° relation to each other and coupled to the deflection plates of electron gun 15 in cathode ray tube 14 by sferics receivers 12 and 13. The tube 14 is of conventional design and is shown only in diagrammatic form. For example, the storage tube shown in U. S. Patents 2,430,303 to Smith; 2,430,038 to Wertz; 2,454,652 to Iams et al.; 2,481,458 to Wertz; and 2,500,633 to Edwards can be utilized in this system. All of these patents disclose tubes whereby one electron gun puts a signal on a mosaic target and a second electron gun takes off this signal.

Cathode ray tube 14 comprises two electron guns 15 and 16, a mosaic target 17 and a grounded load resistor 18 connected to mosaic 17. Electron gun 15 is arranged to charge mosaic 17 in a straight line trace 19, upon the reception of electromagnetic radiation from an electrical disturbance. Electron gun 16 in combination with the deflection system, generates a scanning trace 20 which intersects line 19 at point 21, the sweep being preferably semi-circular so that there will be but one intersection. This effects a discharge of the mosaic at point 19 creating a pulse across load resistor 18 in the conventional manner, as explained in the storage tube patents cited above.

The scanning trace 20 is produced by the use of a 60-cycle oscillator 30 connected to a phasing network 31 of any conventional design. This network splits the oscillator output into two quadrature voltages which are applied to the deflecting plates of electron gun 16 through gate 32.

Oscillator 30 is coupled to a pulse shaper 33 to supply pulses to: (a) a radio synchronizing transmitter 34 of conventional design, (b) a one-shot multivibrator 36 through gate 35, and (c) another radio transmitter 37 through the same gate. Gate 35 is controlled by a one-shot multivibrator 38, triggered upon the reception of a static discharge by receiver 13, and opened for an interval sufficient to allow the first pulse generated after the reception of a static discharge to be fed to multivibrator 36 and transmitter 37 from pulser 33. Multivibrator 36 when triggered by this pulse is timed to open gate 32 for an interval of sufficient duration to pass one half cycle of oscillator 30 so that semi-circular trace 20 is produced on mosaic 17 of cathode ray tube 14 by electron gun 16. This output is also applied to the grid of electron gun 16 to intensify the scanning electron beam 20.

According to well-known principles of storage tubes as stated above, when the circular sweep 20 intersects the straight line 19 applied to the mosaic an instant earlier, there will be an output pulse across load resistor 18 which is fed to transmitter 37 through amplifier 39. Thus, transmitter 37 receives two spaced pulses indicative of the bearing of an electrical flash, the pulse passed by gate 35 and the pulse produced by the intersection of trace 20 with line 19.

Referring now to Fig. 3, the receiving unit for station C at the base station is shown in detail. Two radio receivers, 50 and 51, receive the signal pulses and synchronizing pulses respectively. The synchronizing pulses from transmitter 34 are detected by receiver 51 and fed through an amplifier 52 and multivibrator 53 into a 60-cycle oscillator 54, thereby effectively synchronizing oscillator 54 with oscillator 30. The output from oscillator 54 is applied to a phasing network 55 similar to network 31 to split the oscillator output into two voltage components in quadrature relation. These components are modulated by a 200 kilocycle signal from an oscillator 58 applied to the output of phasing network 55 by modulators 56, 57 and the resultant wave supplied to the deflecting plates of cathode ray tube 59 to provide a rotating radial scanning trace.

The signal pulses detected by receiver 50 are fed to multivibrator 61 through amplifier 60. Both multivibrators 53 and 61 are one shot multivibrators which introduce a very short time delay of the same duration into the system to compensate for the different distances from the stations A, B and C to the base station. This delay is not necessary but allows a greater number of flashes to be resolved per unit time with less chance of any ambiguity as to the identity of any single flash. The output of multivibrator 61 is applied to the grid of electron gun 62 in cathode ray tube 59, this grid being negatively biased by battery 63.

The operation of the system is as follows: The electromagnetic radiation from a lightning flash at X is picked up at station C by loop antennas 10 and 11, amplified and traced on mosaic 17 of cathode ray tube 14 as a straight line 19. This flash also triggers multivibrator 38 which opens gate 35, permitting the first pulse from pulse shaper 33 to trigger multivibrator 36, the output of which supplies a positive pulse to the grid of electron gun 16 and opens gate 32. This first pulse is also fed to transmitter 37. The circuit components are so arranged that when gate 32 is opened, the quadrature voltage output from phasing network 31 will cause a semi-circular sweep 20 to be generated by electron gun 16. This sweep intersects line 19 at 21, causing an output pulse to be generated across output resistor 18 which is supplied to transmitter 37 after being amplified. It can be seen that the time difference between the two pulses fed to transmitter 37 is an indication of the bearing of the lightning flash from the station.

At the base station, the rotating radial sweep is operated in synchronism with the semi-circular sweep of cathode ray tube 14 due to the synchronizing pulses from synchronizing transmitter 34 detected by receiver 51.

The signal pulses from transmitter 37 are detected by receiver 50, amplified, and then applied to the grid of electron gun 62. Normally a negative bias is imposed on the grid to blank the tube. When the signal pulses which originated at station C by the initiation and intersection of the semi-circular scan 20 with the line 19 at 21 are applied to the grid, the electron gun is unblocked for short intervals and portions 64 and 65 of the rotating radial sweep are displayed on the tube face. The angle included between lines 64 and 65 indicates the bearing of the flash X from station C. Similar indications are made on the cathode ray tube screens of A and B receiver units. These cathode ray tube screens are photographed simultaneously in any well-known manner and from the several bearings, the exact position of the lightning flash may be plotted by conventional triangulation methods.

This system has been described with three stations transmitting the sferics data to a base station. It is obvious that two or more stations could be used and the position of the flash plotted in the manner set out above.

While there has been described what is at present considered a preferred embodiment of the invention, it will be obvious to those skilled in the art that various changes and modifications may be made therein without departing from the invention, and therefore, the appended claims cover all such changes and modifications that fall within the true spirit and scope of the invention.

What is claimed is:

1. A meterological telemetering system for locating the position of an electrical disturbance comprising an observation station and a base station, said observation station including a two-electron gun cathode ray storage tube with a mosaic target, means combined with one of said electron guns responsive to said electrical disturbance for tracing on said mosaic a straight line positioned to indicate the bearing of said disturbance, means including a first oscillator and a pulse shaper combined with the other of said electron guns responsive to said disturbance for generating a scanning trace for scanning said mosaic, part of said first oscillator output being converted into synchronizing pulses by said pulse shaper, said pulse shaper generating a first pulse at the start of said scanning and means for generating a second pulse when scanning trace intersects said straight line trace whereby the time interval between said pulses indicates the bearing of said disturbance from said observation station, means to transmit said synchronizing pulses and means to transmit said first and second pulses, said base station including a detection unit for said observation station including first and second receivers, a second oscillator and a cathode ray tube, said first receiver for detecting said synchronizing pulses coupled to said second oscillator whereby said first and second oscillators operate in synchronism, means including said second oscillator coupled to said cathode ray tube so that a rotating radial trace is generated in said tube that operates in synchronism with said scanning trace, said second receiver for detecting said first and second pulses coupled to the grid of said cathode ray tube whereby said cathode ray tube display will indicate said bearing of said disturbance from said observation station.

2. In a meterological telemetering system for locating the position of an electrical disturbance of short duration, an observation station including directional antennas, a two-electron gun cathode ray storage tube having a mosaic target, receiver means coupled to said antennas and said cathode ray storage tube to produce a straight line on said mosaic indicative of the bearing of said disturbance, a pulse transmitter, a semi-circular sweep scanning generator coupled to said other gun, means responsive to said receiver for simultaneously applying a first pulse to said pulse transmitter and initiating the operation of said scanning generator, means including said mosaic target for generating a second pulse when said scanning beam intersects said straight line trace so that the time interval between said pulses is a function of the bearing of said disturbance from said observation station, means for transmitting said second pulse, a base station including a receiver and a cathode ray tube, means for displaying said first and second pulses on said cathode ray tube to indicate said bearing of said disturbance from said observation station.

3. A meterological telemetering system for locating the position of an electrical disturbance comprising an observation station and a base station, said observation station including directional antennas, a two-electron gun cathode ray storage tube having a mosaic target, receiver means coupled to said antennas and one electron gun of said cathode ray storage tube whereby said electron gun will trace a straight line on said mosaic indicative of the bearing of said disturbance, a pulse transmitter, means for producing semi-circular sweeps and synchronizing pulses, means responsive to said disturbance for simultaneously applying a first pulse to said pulse transmitter and initiating the semi-circular sweep of said other electron gun for scanning said mosaic, means including said mosaic for generating a second pulse when said scanning beam intersects said straight line trace so that the time interval between said pulses is a function of the bearing of said disturbance from said observation station, means for transmitting said second pulses to said base station, said base station including first and second receivers, an oscillator and a cathode ray tube, said first receiver coupled to said oscillator whereby said oscillator is synchronized with said synchronizing pulses, means including said oscillator coupled to said cathode ray tube for producing a rotating radial trace on said cathode ray tube, said second receiver for detecting said first and second pulses and coupled to the grid of said cathode ray tube whereby said cathode ray tube display will indicate the bearing of said disturbance from said observation station.

4. A meterological telemetering system for locating the position of an electrical disturbance comprising an observation station and a base station, said observation station including a two-electron gun cathode ray storage tube with a mosaic target, means combined with one of said electron guns responsive to said electrical disturbance for tracing on said mosaic a straight line positioned to indicate the bearing of said disturbance, means responsive to said disturbance for generating a semi-circular scan by the other electron gun and for producing synchronizing pulses, means for generating a first pulse at the start of said scanning and means for generating a second pulse when said scanning trace intersects at straight line trace whereby the time interval between said pulses is a function of the bearing of said disturbance from said observation station, means to transmit said synchronizing pulses and means to transmit said first and second pulses, said base station including first and second receivers, an oscillator and a cathode ray tube, said first receiver coupled to said oscillator for synchronizing said oscillator with said synchronizing pulses, means including said oscillator coupled to said cathode ray tube so that a rotating radial trace is generated in said tube, said second receiver for detecting said first and second pulses coupled to the grid of said cathode ray tube whereby said cathode ray tube display indicates the bearing of said disturbance from said observation station.

References Cited in the file of this patent

UNITED STATES PATENTS

| Number | Name | Date |
|---|---|---|
| 2,399,671 | Gage | May 7, 1946 |
| 2,402,688 | Skurnick | June 25, 1946 |
| 2,405,239 | Seeley | Aug. 6, 1946 |
| 2,428,966 | Gage | Oct. 14, 1947 |
| 2,451,000 | Smith | Oct. 12, 1948 |